J. N. VANDEGRIFT.
ANTIFRICTION THRUST BEARING.
APPLICATION FILED SEPT. 22, 1911.

1,106,065.

Patented Aug. 4, 1914.

WITNESSES:
Chas H Young
L Davis

INVENTOR
James N. Vandegrift
BY
Parsons Hall & Bodell
ATTORNEYS

UNITED STATES PATENT OFFICE.

JAMES N. VANDEGRIFT, OF SYRACUSE, NEW YORK, ASSIGNOR TO RAILWAY ROLLER BEARING COMPANY, OF SYRACUSE, NEW YORK, A CORPORATION OF NEW YORK.

ANTIFRICTION THRUST-BEARING.

1,106,065. Specification of Letters Patent. Patented Aug. 4, 1914.

Original application filed December 27, 1910, Serial No. 599,275. Divided and this application filed September 22, 1911. Serial No. 650,748.

*To all whom it may concern:*

Be it known that I, JAMES N. VANDEGRIFT, of Syracuse, in the county of Onondaga and State of New York, have invented a new and useful Antifriction Thrust-Bearing, of which the following is a specification.

This invention has for its object the production of an antifriction thrust bearing which is particularly simple in construction and highly efficient and durable in use; and it consists in the novel features of construction hereinafter set forth and claimed.

In describing this invention reference is had to the accompanying drawing in which like characters designate corresponding parts in all the views.

Figure 1:
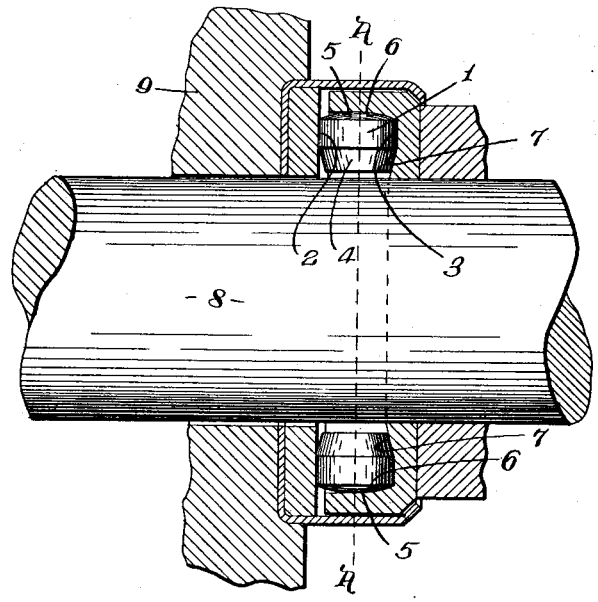
Figure 2:
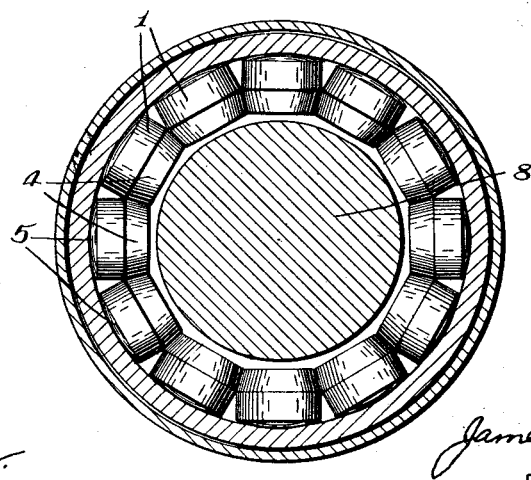

Figure 1 is a sectional view of a preferable form of my invention. Fig. 2 is a sectional view on line A—A, Fig. 1.

This thrust bearing comprises, generally, a raceway, and an annular series of antifriction members in the raceway, the antifriction members running in direct engagement with each other and each being of large diameter compared with its length and having a cylindrical peripheral surface 1 for engaging the opposite bearing surfaces 2, 3 of the raceway, and a conical peripheral surface 4 at its inner end, with respect to the center of the raceway, for engaging the conical surfaces 4 of the next antifriction members, each member also preferably having a spherical outer end face 5 for engaging the circumferential bearing surface 6 of the raceway.

The circumferential surface 6 is usually formed concave in cross-section to conform to the spherical end faces 5 of the antifriction members and one of the side bearing surfaces of the raceway as the side bearing surface 3 is formed with a conical portion 7 for engaging the conical surfaces 4 of the antifriction members.

The conical surfaces 4 which run in engagement with each other extend radially with the center of the raceway, and owing to the fact that such conical surfaces engage, the antifriction members are confined radially and such surfaces add to the mass of the antifriction members to sustain crushing strains without increasing the tread or peripheral surface of the roller.

In the drawings, I have shown the bearing as adapted to an ordinary shaft 8 journaled in a suitable bearing 9 which supports the raceway.

Another adaptation of this thrust bearing is shown in my pending application Sr. No. 599,275, filed Dec. 27, 1910 of which application this is a division.

What I claim is:

1. An end thrust bearing comprising a part formed with a raceway confined by a circumferential bearing surface and opposite side bearing surfaces, and a series of antifriction members movable in the raceway in direct contact with each other, each member being of large diameter compared with its length and having a spherical end surface at one end for engaging the circumferential surface of the raceway, a cylindrical peripheral surface intermediate of its ends for engaging the side bearing surfaces of the raceway, and a peripheral conical surface at its other end for engaging the conical surfaces of the next antifriction members, substantially as and for the purpose specified.

2. An end thrust bearing comprising a part formed with a raceway confined by a circumferential bearing surface and opposite side bearing surfaces, and a series of antifriction members in the raceway running in direct contact with each other, the circumferential surface of the raceway being concave in cross section and each antifriction member having a spherical end surface at one end for engaging the concave circumferential surface of the raceway, a cylindrical peripheral surface for engaging the opposite side bearing surfaces of the raceway, and a conical peripheral surface at its other end for engaging the conical surfaces of the next antifriction members, one of the side bearing surfaces of the raceway having a conical portion for engaging said conical surfaces of the antifriction members, substantially as and for the purpose set forth.

In testimony whereof, I have hereunto signed my name in the presence of two attesting witnesses, at Syracuse, in the county of Onondaga, in the State of New York, this 30th day of Aug., 1911.

JAMES N. VANDEGRIFT.

Witnesses:
S. DAVIS,
L. M. DAVIS.